March 9, 1965

G. HIRS 3,172,846

FILTER PROCESS

Filed March 14, 1960

INVENTOR.
GENE HIRS.
BY
Wallace P. Lamb
ATTORNEY.

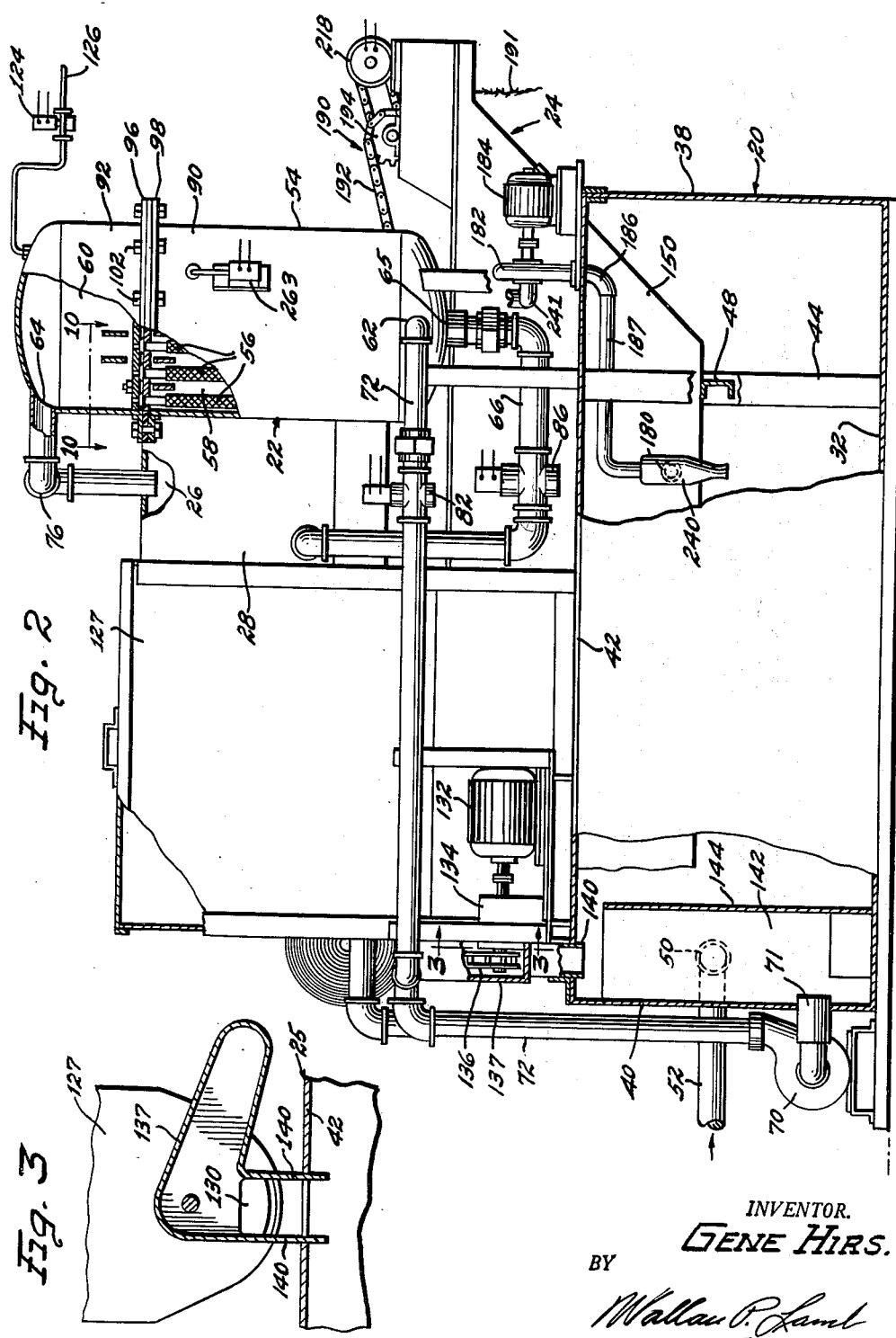

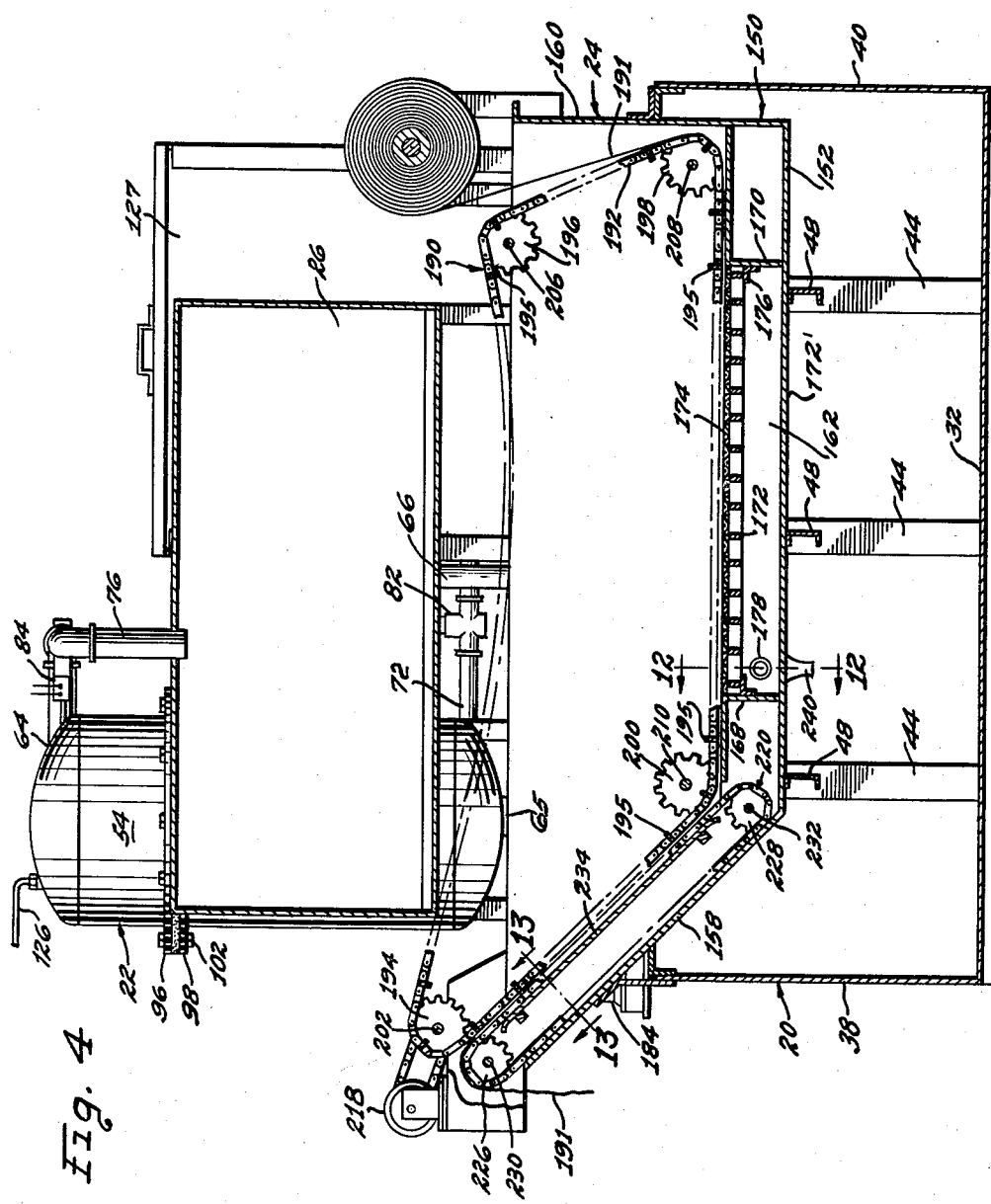

March 9, 1965
G. HIRS
3,172,846
FILTER PROCESS
Filed March 14, 1960
7 Sheets-Sheet 4
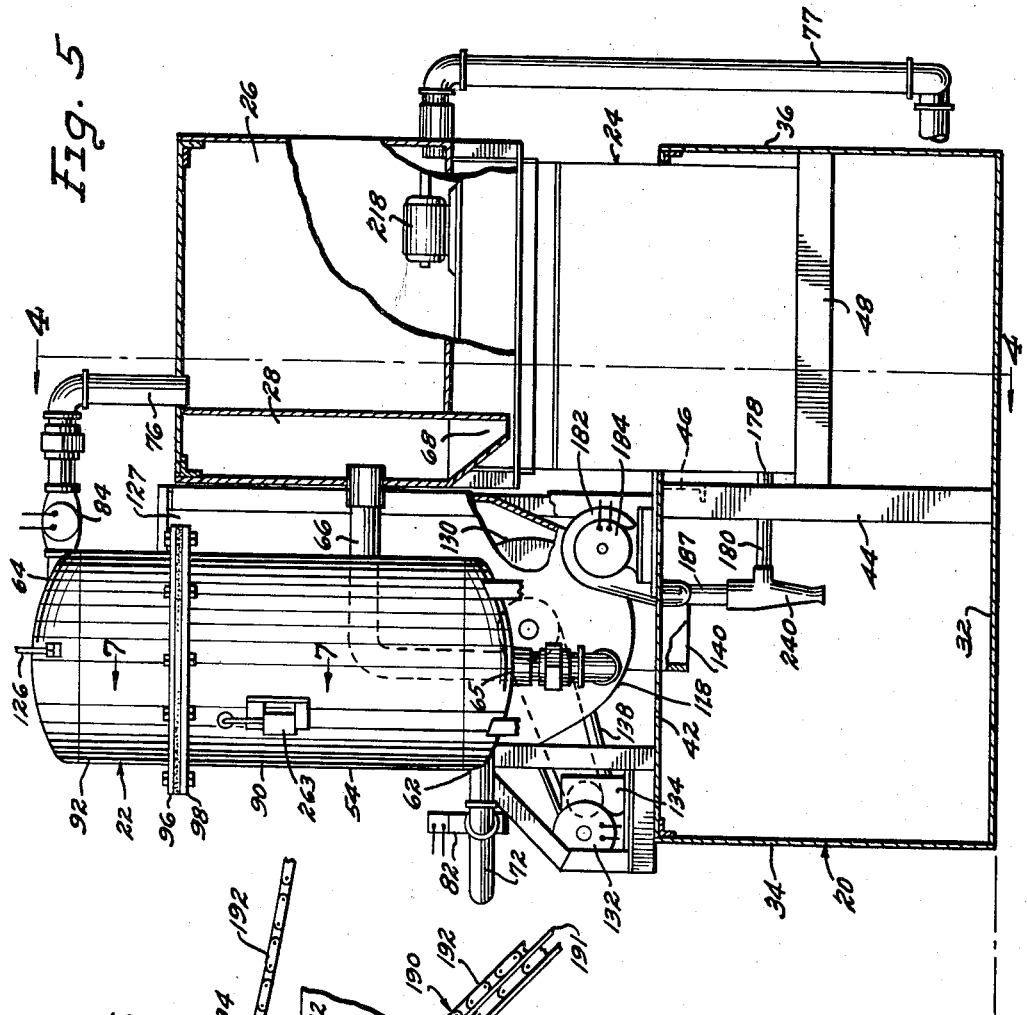
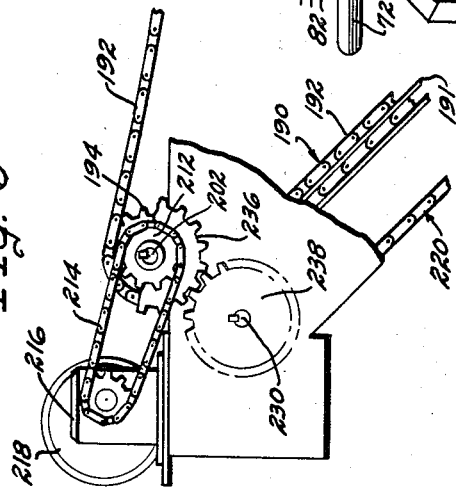
INVENTOR.
GENE HIRS.
BY
Wallace P. Lamb
ATTORNEY.

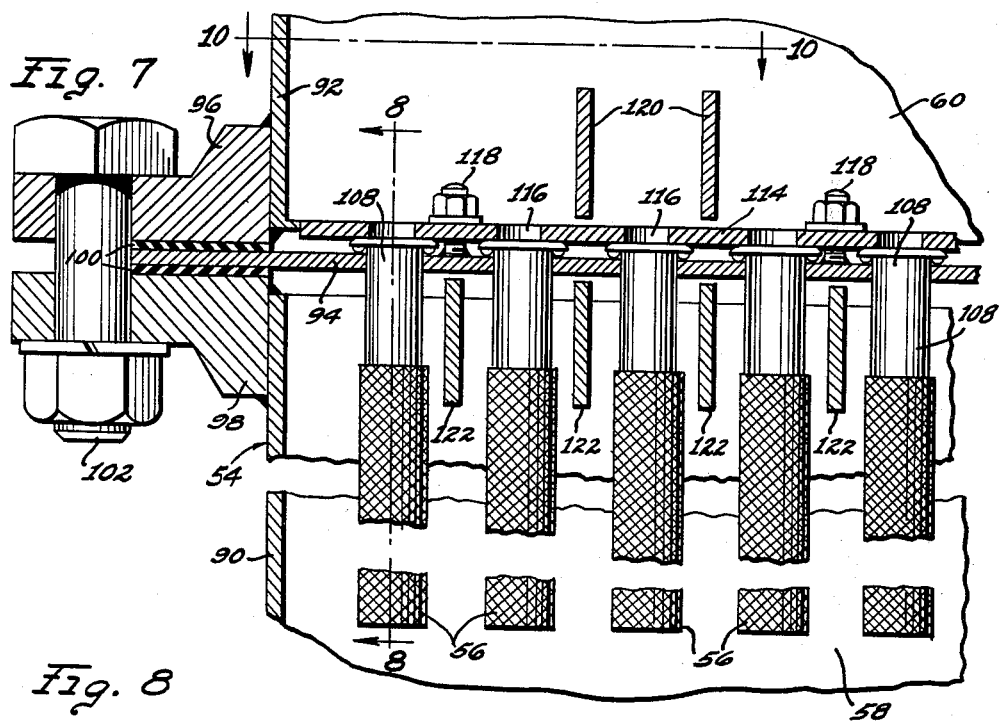
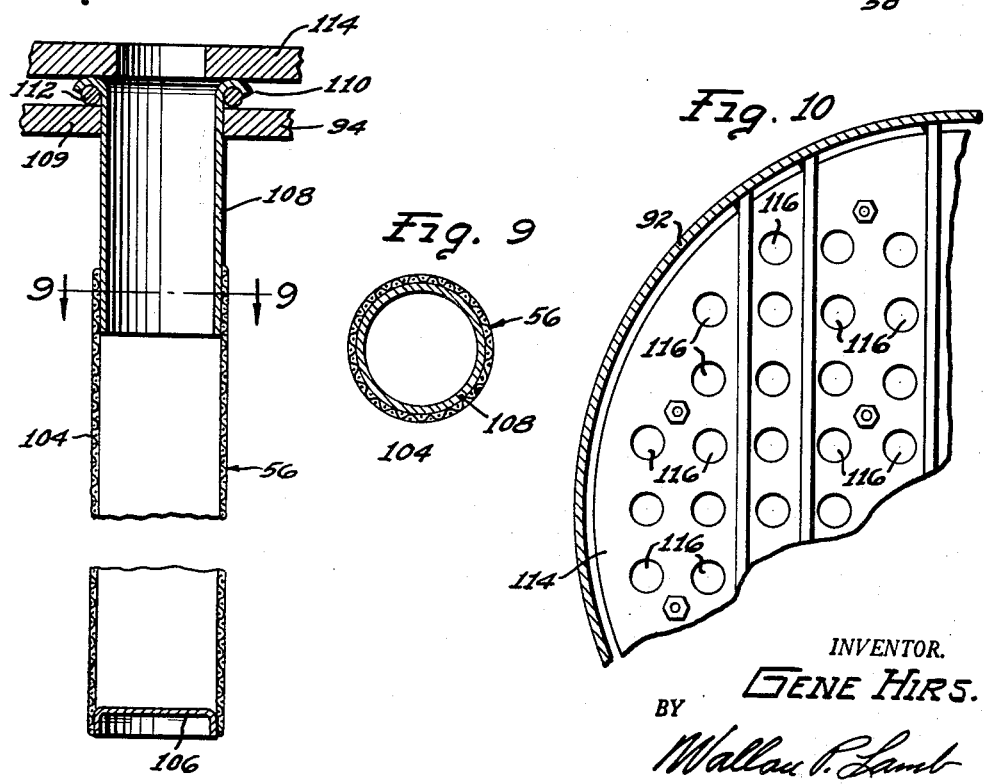

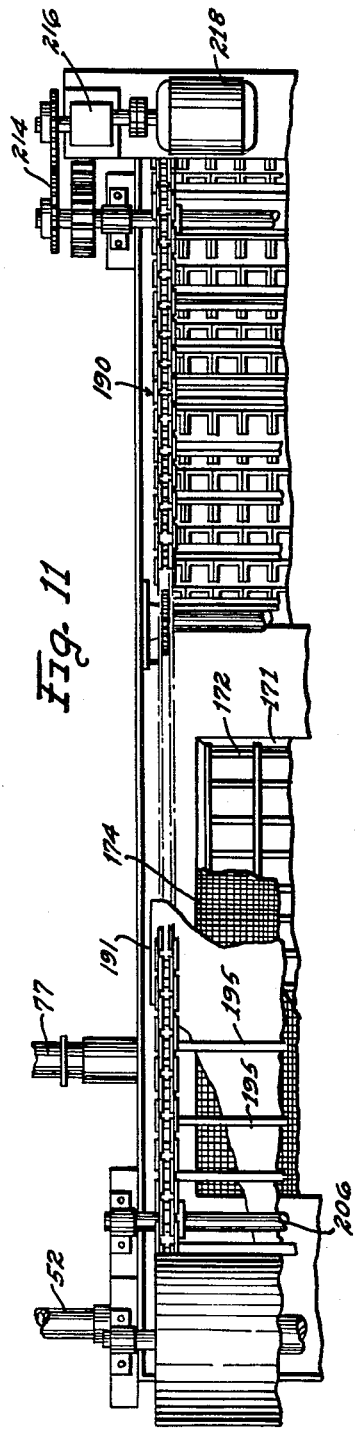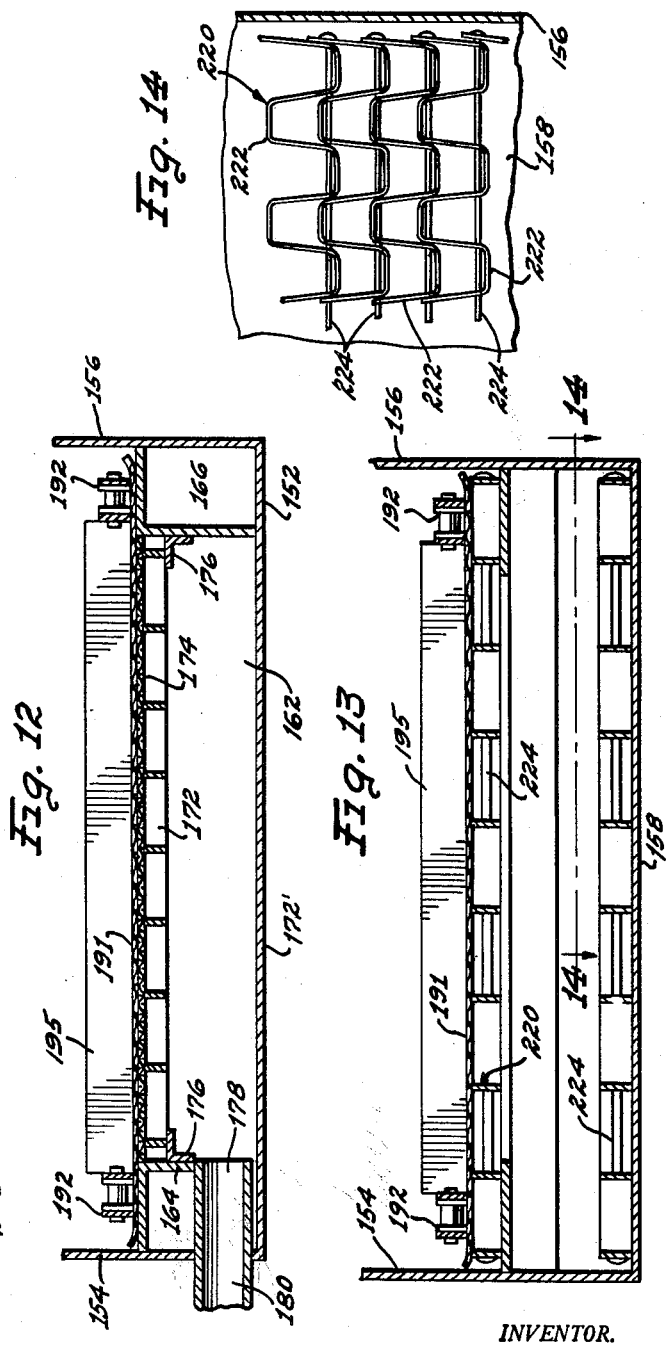
INVENTOR.
GENE HIRS.
BY
Wallace P. Lamb
ATTORNEY.

INVENTOR.
GENE HIRS.
BY
Wallace P. Lamb
ATTORNEY.

000000## United States Patent Office 3,172,846
Patented Mar. 9, 1965

3,172,846
FILTER PROCESS
Gene Hirs, 17208 Greenview Road, Detroit, Mich.
Filed Mar. 14, 1960, Ser. No. 14,904
3 Claims. (Cl. 210—75)

This invention relates generally to filter apparatus and particularly to liquid filter apparatus.

One of the objects of my invention is to provide an improved liquid filter method having an automatic cleaning operation that does not appreciably interrupt the filtering operation.

Another object of the invention is to provide an improved liquid filter method having overlapping non-interfering filtering and cleaning cycles.

Another object of the present invention is to provide an improved liquid filter method that can handle heavy slimes and sludges successfully.

Another object of the invention is to provide an improved liquid filter method of a type such that the foreign matter filtered out can be quickly forced out of the filter to allow for substantially immediate return to filter operation.

Another object of the invention is to provide filter method wherein former problems of the blow-down cleaning and filtrate disposal operations are overcome and one in which the operations are completely automatic.

Other objects of the invention will become apparent from the following detail description taken in connection with the accompanying drawings in which:

FIG. 2 is a side elevation of the filter apparatus having parts broken away and shown in section;

FIG. 3 is a vertical sectional view, taken along the line 3—3 of FIG. 2;

FIG. 4 is a vertical sectional view, taken along the line 4—4 of FIG. 5;

FIG. 5 is an end view of the apparatus as viewed from the right of FIG. 2;

FIG. 6 is an enlarged fragmentary view of certain details;

FIG. 7 is a vertical sectional view, taken along the line 7—7 of FIG. 5;

FIG. 8 is a vertical sectional view, taken along the line 8—8 of FIG. 7;

FIG. 9 is a cross sectional view, taken along the line 9—9 of FIG. 8;

FIG. 10 is a horizontal view partly in elevation and taken along the line 10—10 of FIG. 7;

FIG. 11 is a fragmentary plan view of one of the units of the filter apparatus;

FIG. 12 is a cross sectional view of the unit of FIG 11, and taken along the line 12—12 of FIG. 4;

FIG. 13 is another cross sectional view of the unit of FIG. 11, and taken along line 13—13 of FIG. 4;

FIG. 14 is a horizontal view partly in section and taken along the line 14—14 of FIG. 13

Figure 1:
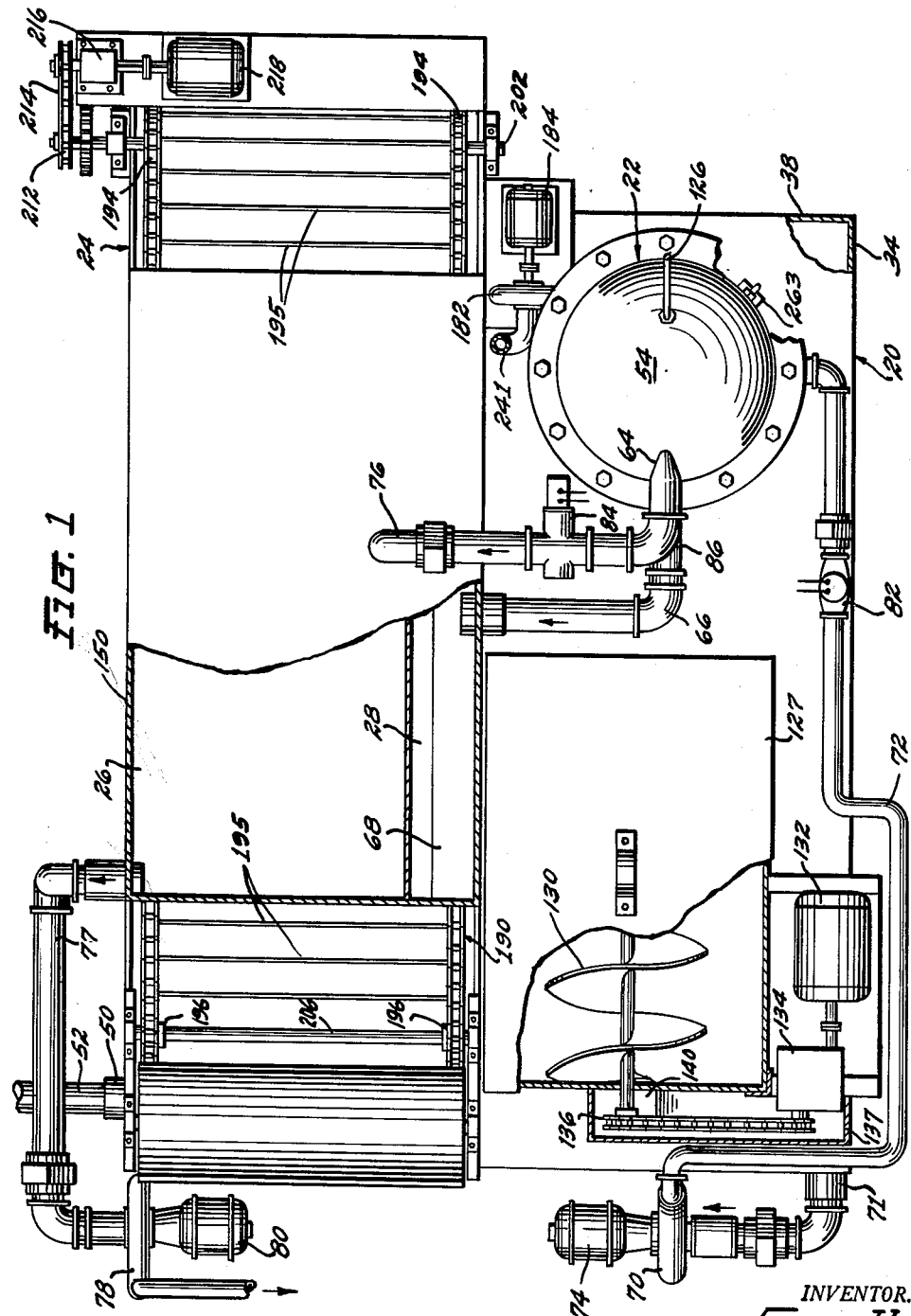
FIG. 1 is a plan view partly broken away and in section of a filter apparatus embodying features of my invention.

Referring to the drawings by characters of reference, my liquid filter apparatus comprises, in general, a supporting structure and tank 20, a liquid filter 22, a foreign matter or sludge disposal unit 24. The filter 22 and disposal unit 24 are mounted on the top of the tank 20, the filter 22 being above the tank 20 and the disposal unit 24 extending part way downwardly into the tank. Also mounted on the tank 20 is a tank 26 that receives clean liquid or filtrate from the filter 22, and a surge tank 28 that is positioned laterally of tank 26 and communicatively connects the filter 22 with the sludge disposal unit for a purpose hereinafter described.

The tank 20, in addition to supporting all of the other components of the filter apparatus, is provided to contain a large body of contaminated liquid to be filtered. In the present apparatus, the tank 20 is a box-like structure having a bottom wall 32, side walls 34 and 36, end walls 38 and 40 and a top wall 42. Between the side walls 34 and 36 there is preferably a row of upright load supporting members or posts 44 and on the upper ends of the posts is a reinforcing beam 46 for the top 42 of the tank 20, as is clearly shown in FIG. 5. Mounted on and rigidly secured to the posts 44 and to the tank side wall 36 are spaced apart cross members 48 on which the sludge disposal unit 24 is rigidly supported below the top of tank 20. Contaminated liquid to be filtered enters tank 20 at an inlet 50 to which the liquid is conducted by a pipe 52. Any kind of liquid may be filtered by the apparatus, such as for example, a liquid coolant or cooling oil that passes over machine tools and requires the removal of metal particles, dirt, sludge and other foreign matter before recirculation of the liquid to the machines.

The filter 22 comprises a container 54 and a filter media, preferably a number of tube-like filter elements 56. Arranged within the container 54, the filter elements 56 divide the interior of the container into a lower inlet chamber 58 for the contaminated liquid and an upper outlet chamber 60 for the filtrate. The inlet chamber 58 has an inlet 62, preferably adjacent the bottom of container 20, and the outlet chamber 60 has an outlet 64, preferably adjacent the top of the container. In the bottom of the inlet chamber 58 there is provided a normally closed outlet 65 for the evacuation of unfiltered liquid, sludge and other foreign matter during an automatic filter cleaning cycle of operation that is hereinafter described. Piping 66 connects the outlet 65 to the surge tank 28 which has a downwardly directed discharge 68 into the sludge disposal unit 24, as shown for example in FIG. 5.

A pump 70, connected, as at 71, to the contaminated liquid tank 20 delivers the liquid through piping 72 to the inlet 62 of filter 22 and maintains the pressure in the filter container 54 above atmospheric pressure to effect high capacity filtration. A suitable electric motor 74 drives the pump 70. From the outlet 64 of filter 22, piping 76 conducts the filtrate to the clean liquid tank 26 from which the liquid is conducted by piping 77 under the action of a pump 78, driven by an electric motor 80, to one or more points of use of the liquid, such as the previously mentioned machine tools from which the liquid returns by pipe 52 to tank 20. A normally open solenoid valve 82 in piping 72 controls flow of liquid to filter 22; a second normally open solenoid valve 84 in piping 76 controls flow from filter 22 to the clean liquid tank 26; and a third, but normally closed solenoid valve 86 controls the filter outlet 65. When the aforementioned filter cleaning cycle is initiated, the positions of the solenoid valves 82, 84 and 86 are reversed to stop the filtering operation for a purpose hereinafter described.

The filter container 54 is preferably cylindrical in shape and constructed of two secured together sections including a relatively large lower section 90 and a relatively small upper section 92. Separating the opposed ends of the container sections 90 and 92 is a plate 94 which together with the filter elements 56 divides the container into the upper and lower chambers 60 and 58 respectively. Carried by and depending from the plate 94 into the lower chamber 58 are the filter elements 56 which are preferably arranged in relative staggered relation so that within practical limits, the maximum number of such elements may be received within the container 54. An outer margin of the plate 94 around the entire periphery thereof is held between annular flanges 96 and 98 which are respectively provided on the container sections 90 and 92. Gaskets 100 interposed between the flanges 96 and 98 are displaced by the tightening of nuts on bolts 102 so as to provide a fluid tight joint between the container sections.

The filter elements 56 may each comprise a fine, wire mesh body 104 of cylindrical shape having the lower end thereof closed by a reinforcing disc 106, and the upper end reinforced by an open ended sleeve 108. In the plate 94 there is provided a plurality of rows of apertures 109 for respectively receiving the sleeves 108 of the filter elements 56 and each of the sleeves is provided on its upper end with an annular flange 110. Beneath each of the annular flanges 110 there is a gasket 112 which seats on the upper surface of the plate 94 and a clamping plate 114 rests on the annular flanges 110 having apertures 116 registering with the sleeves 108, thus establishing communication between the interiors of the filter elements 56 and the upper outlet chamber 60. The clamping plate 114 is drawn down tightly to plate 94 by nuts threaded onto upstanding studs 118 that are welded to plate 94. When drawn down by the nuts on studs 118, the clamping plate 114 displaces the gaskets 112 to seal the joints between the sleeves 108 and plates 94 and 114. Above and below the plates 114 and 94, in close proximity thereto is a number of spaced horizontal reinforcing ribs 120 and 122. The ribs 120 and 122 are welded at their opposite ends to the side wall of the filter container sections 92 and 90 respectively, and in addition to reinforcing said sections, limit any deflection of the plates 94 and 108 that may occur under the high pressures to which the interior of the container is subjected.

As is well known, filter media becomes clogged with foreign matter which reduces the filter rate and must be removed if high filtering efficiency is to be maintained. Removal of the foreign matter requires a filter shut-down period which in the past was of necessity of such long duration as to appreciably decrease filtering efficiency. In my present filtering, the above mentioned shut-down period has been reduced substantially to the interval required to discharge all of the unfiltered liquid in filter 22 into the sludge disposal unit 24. To this end, I provide, on shut-down of the filter operation, for the introduction of compressed air into the outlet chamber 60 under control of a normally closed solenoid valve 124 in an air line 126 that connects to the top of container 50 in communication with chamber 60. It will be seen that the introduction of compressed air into the filter chamber 60 will force the contents of the filter 22 out of the only opening that is open at the time, namely the outlet 65, whence the contents of the filter 22 is discharged into the sludge disposal unit 24.

In order to remove minute foreign matter from the contaminated liquid, a filter aid, which may be any suitable diatomaceous material, or fuller's earth is deposited on the screens of the filter elements 56 in cake form, which is held to the elements by the liquid pressure. The filter aid is removed each time that the filter 22 is cleaned and so a supply of the filter aid is maintained in a container 127 for deposit on the filter elements following each cleaning cycle. As shown in FIGS. 4 and 5, the filter aid container 127 has its side walls tapered inwardly to a rounded bottom wall 128 providing a trough in which is disposed a feed screw 130 that is journaled in the opposite end walls of the container 127. An electric motor 132 connected to a speed reduction gear mechanism 134 drives the feed screw 130 by a gear and chain drive connection 136. A guard 137 for the gear and chain drive 136 overlies a filter aid discharge opening 138 in container 127 and has a downwardly directed spout 140 that discharges into a chamber 142 that is separated from tank 20 by a partition 144. Chamber 142 is in communication with tank 20, the partition 144 functioning to prevent circulation of the filter aid throughout tank 20. By operating the motor 132 for a predetermined interval, a measured amount of the filter aid is discharged into the chamber 142 for deposit on the filter elements 56.

Referring now to the sludge disposal unit 24, this unit includes a tank 150 having a bottom wall 152, upright side walls 154 and 156, and opposite end walls 158 and 160. At the bottom of the tank, I provide an outlet chamber 162 formed by side walls 164 and 166, end walls 168 and 170 and a portion 172' of the tank bottom wall 152. The walls 164 and 166 and the walls 168 and 170 form a box-like structure that extends partway upwardly within the tank 150, the upper edges of the walls providing an upwardly facing inlet into chamber 162 from tank 20 for flow of liquid from the tank downwardly into the outlet chamber 162. The upper edges of the walls of chamber 162 also provide an upwardly facing seat 171, FIG. 11, for a purpose to be described.

Positioned within the outlet chamber 162 there is a grate 172 which extends to the walls of the chamber and is disposed adjacent the top of the chamber. Covering the grate 172 is a fine mesh wire screen 174 that seats on and is preferably flush with the upper edges of the chamber walls 164, 166, 168 and 170. The screen 174 may be welded or be otherwise suitably secured to the grate 172 and the grate may be supported on angle members 176, welded to the walls of chamber 162. An outlet 178 is provided for chamber 162 and is connected by a pipe 180 to the outlet of a pump 182 that is driven by an electric motor 184. The outlet, as at 186, of the pump 182 discharges through a pipe 187 into the contaminated liquid tank 20, as shown in FIG. 4.

A conveyor 190 is provided to hold a strip of filter media 191 down against the seat 171, around the inlet to chamber 162, to overcome the tendency of the filter media to float upwardly in the liquid and also to move the media along a path of travel out of tank 150 to dispose of the dirt, sludge and other foreign material filtered from the liquid. The conveyor 190 comprises two laterally spaced continuous chains 192 connected together by longitudinally spaced media engaging members or flight bars 195 which may be welded at their opposite ends respectively to links of the chains 192. The flight bars 195 function to hold the filter media 191 down against the seat 171 and also function to grip and carry the media along its path of travel when the media is moved to replace the soiled portion overlying the screen 174 and discharge the foreign matter from tank 20.

The conveyor 190 further includes a pair of drive sprockets 194 and three pairs of guide sprockets 196, 198 and 200 which are arranged such that the conveyor 190 is guided thereby down into the liquid adjacent tank end wall 160 and then horizontally across the seat 171 and then upwardly out of the liquid near the inclined tank end wall 158. The pair of drive sprockets 194 are fixed onto a drive shaft 202 which may be rotatably supported in bushings 204 mounted on and secured to the tank side walls 154 and 156. The pairs of guide sprockets 196, 198 and 200 are rotatably mounted respectively on shafts 206, 208 and 210 which may be mounted on and suitably fixed to the tank side walls 154 and 156. As previously mentioned, the chains 192 are of the continuous type adapted to travel about the sprockets 194, 196, 198 and 200 the centers of which form the apices of a quadrilateral as seen viewing FIG. 3. It will be seen that the sprockets are arranged such that the conveyor travels from guide sprockets 196 downwardly toward tank end wall 160, around sprockets 198 and horizontally across the chamber screen 174, around the sprockets 200, and then up the incline around the drive sprockets 194. The conveyor passes out of tank 150 above tank end wall 38 and the filter media 191 and foreign matter thereon rolls off of the conveyor and may be caught in a suitable container (not shown). One end of the drive shaft 202 extends sufficiently beyond its adjacent bushing to receive a driven sprocket 212 that is driven by a chain drive 214 from the shaft of a speed reduction mechanism 216 that is driven by an electric motor 218.

A second endless conveyor 220 is provided to cooperate with and aid conveyor 190 in moving the filter media 191 along its path of travel against the load acting on the media. The conveyor 220 is arranged at the same inclination as the ramp portion of conveyor 190, the conveyors having their lead sides in back-to-back relationship so as to grip the filter media therebetween, as illustrated in FIGS. 3 and 5. The conveyor 220 may be of any suitable type, such as the metal link type, illustrated by FIG. 13. This is a well known link type of construction which comprises a plurality of sinuously formed sheet metal cross members or flights 222 that are pivotally interconnected by parallel cross rods 224. In addition to the strength and flexibility of the conveyor 220, the edges of the sinuous flights 222 collectively present a large gripping surface to engage and urge the filter media 191 along its path of travel.

The conveyor 220 travels about an upper pair of driven sprockets 226 and a lower pair of guide sprockets 228 arranged so that the upper or lead side of the conveyor 220 is parallel with the inclined portion of the conveyor 190. The upper sprockets 226 of conveyor 220 are fixed on a driven shaft 230 that may be suitably journaled on mountings on the tank side walls 154 and 156, and the guide sprockets 228 are mounted for rotation on a shaft 232 which may be suitably fixed in and to the side walls 154 and 156. Spaced supports 234 provide slideways under the lead side of the conveyor 220. The trailing side of the conveyor 220 is preferably supported and slidably guided on the inclined tank end wall 158 which, as shown, is inclined and parallel to the slideways 234. The conveyors 190 and 220 are driven at the same speed by motor 218 which drives conveyor 220 through gears 236 and 238 that are respectively keyed to shafts 202 and 230.

Figure 15:
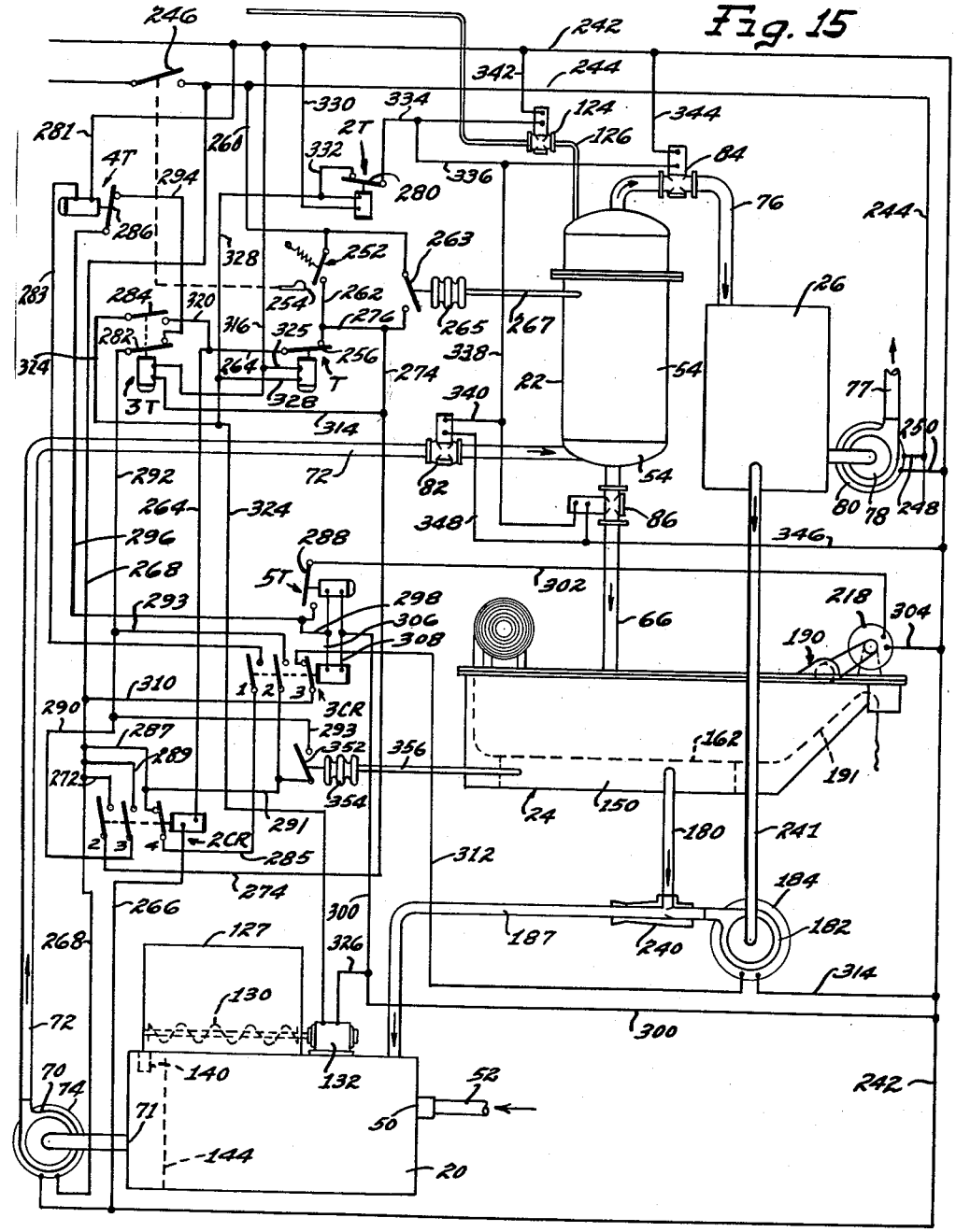
FIG. 15 is a diagrammatic illustration of the apparatus including its electrical control system and circuitry therefor.

With reference particularly to the diagrammatic illustration of FIG. 15, an ejector or aspirator 240 is interposed between the outlet of pump 182 and the contaminated liquid tank 20, the intake of the pump 182 being connected to the clean liquid tank by a pipe 241. The clean liquid discharged by the pump 182 through the ejector 240 creates a reduced pressure or suction in pipe 180 to pump the contaminated liquid from tank 150 into tank 20 without need of the contaminated liquid passing through the pump. In addition, when all of the liquid has been withdrawn from tank 150, air is ejected from the compartment 162 of tank 150 and is drawn down through the foreign matter or sludge on the portion of the filter media that is overlying the screen 174 whereby to dry the foreign matter so that it is not such a messy disposal problem.

The numerals 242 and 244 designate main electric lines which are connected to a suitable source of electric power, and in line 244 there is the usual line switch 246. This switch remains closed until it is desired to shut down the filter apparatus, such as for example, at the end of a work day, or for any other reason. When the line switch 246 is closed, the motor 80, which is connected across the main lines 242, 244 by leads 248 and 250 is started and drives the pump 78 to deliver clean liquid from tank 26 to points of use of the liquid. The pump 78 operates continuously, i.e., during the cleaning cycle, as well as the filter cycle, the capacity of tank 26 being made sufficient for the supply of liquid to the points of use during the relatively short shut-down period of the cleaning cycle. Also, the pump 70 is started when line switch 246 is closed, the pump motor 74 having one terminal connected to main line 242 and the other terminal connected by lead 268 to the other main line 244.

A normally open switch 252, mechanically connected to line switch 246 to close therewith, is provided to energize a relay 2CR, the switch 252 functioning only on the starting of the apparatus after a shut-down period, that is, when the line switch 246 is opened. The switch 252 is of the push-button type in that it remains closed only momentarily, or long enough to energize relay 2CR which, as will be later understood, closes a holding circuit to hold the relay energized after switch 252 opens. In the present illustration, the switch 252 is shown as spring biased to open position and a cam 254, operable by switch 246 is adapted to close switch 252 momentarily and then release the switch to allow it to be opened by its spring. A timer T controls the relay 2CR and has a pair of normally closed contacts 256. The switch 252, contacts 256 of timer T, and relay 2CR are connected across the main lines 244 and 242 by leads 260, 262, 264 and lead 266. In parallel circuit with the switch 252 and thus connected to leads 260 and 274 there is a pressure responsive switch 263 which is actuated by a bellows 265 that is connected by a pipe 267 to the container 54 of the filter 22. The pressure responsive switch 263 is the main control and assumes control of the apparatus after the closing of line switch 246.

The relay 2CR has three sets of contacts including a pair of normally open contacts 2CR2, a pair of normally open contacts 2CR3, and a pair of normally closed contacts 2CR4. Contacts 2CR2 are connected through the timer T contacts 256 to provide a holding circuit for the relay 2CR, and the holding circuit includes lead 268 from main line 244, lead 272, contacts 2CR2, leads 274, 276, timer T contacts 256, lead 264, relay 2CR and lead 266 to the other main line 242. Thus, the holding circuit contacts 2CR2 will hold relay 2CR until timer T opens its contacts 256 to break the holding circuit of 2CR2.

In addition to the control or timer T there are provided other controls including a timer 2T having a pair of contacts 280, a timer 3T having two pairs of contacts 282 and 284, a timer 4T having a pair of contacts 286, and a timer 5T having a pair of contacts 288. The coil of timer 5T is energized when the main relay 2CR is energized and closes contacts 2CR3. The circuit of the contacts 2CR3 and the coil of timer 5T include lead 268 from main line 244, lead 289, contacts 2CR3, leads 290, 292, the normally closed contacts 282 of timer 3T, a lead 294, the normally closed contacts 286 of timer 4T, a lead 296, a hold circuit lead 298, the coil of timer 5T and a lead 300 to the other main line 242. This circuit is completed when relay 2CR is energized, since contacts 282 and 286 of timers 3T and 4T respectively are normally closed. After a predetermined interval, the timer 5T contacts 288 close to complete a circuit to the conveyor driving motor 218 of the filter disposal unit 24, the circuit including lead 268 from main line 244, lead 289, 2CR3 contacts, leads 290, 292, timer 3T contacts 282, lead 294, timer 4T contacts 286, lead 296, timer 5T contacts 288, a lead 302, motor 218, and a lead 304 to the other main line 242.

The coil of timer 5T is connected to the coil of a relay 3CR by leads 306 and 308, the relay having three pairs of contacts 3CR1, 3CR2 and 3CR3. The relay 3CR controls the pump 182 of unit 24 through contacts 3CR3 which are connected in circuit with the pump motor 184, the circuit including lead 268 from main line 244, a lead 310, relay contacts 3CR3, a lead 312 to one terminal of pump motor 184 and a lead 314 from the other pump motor terminal to the main line 242. The coil of timer 4T includes a lead 281 from main line 242 to the coil and a lead 283 from the coil to relay contacts 3CR1, a lead 285 to relay contacts 2CR4, a lead 287 to lead 268 and to the other main line 244. The contacts 3CR2 are connected by a lead 291 to lead 287 and thus to lead 268 which connects to main line 244, and the contacts 3CR2 are also connected by a lead 293 to lead 292 which through the contacts 282 of relay 3T, lead 294, contacts 286 of relay 4T, lead 296, contacts 288 of 5T, lead 302, motor 218 and lead 304 to main line 242. Controlling the conveyor motor 218 there is a pressure responsive switch 352 which is actuated by a bellows 354 that is connected by a pipe 356 to the outlet chamber 162 of tank 150. When pump 184 has removed most of the liquid from the outlet chamber 162, the pressure therein decreases and when the decreased pressure reaches the pressure for which switch 352 is set, the switch closes and starts the conveyor motor 218.

Timer 3T which controls the conveyor motor 218, as previously mentioned, through the timer 3T contacts 282 is energized at the same time that relay 2CR is energized, the circuit of the coil of timer 3T being from main line 244, lead 260, the momentarily closed switch 252, leads 262, 276, 274, a lead 314, the coil of timer 3T, and a lead 316 to the other main line 242. This circuit is held closed by the relay 2CR controlled holding circuit which includes lead 268 from main line 244, lead 272, relay contacts 2CR2, leads 274, 314, the coil of timer 3T and lead 316 to the other main line 242. Further the timer 3T controls the motor 132 of the filter aid dispenser 130 by way of the contacts 284 of the timer 3T, the circuit including leads 268, 272, contacts 2CR2, leads 274, 276, contacts 256 of timer T, lead 264, a lead 320, contacts 284 of timer 3T, a lead 324 to motor 132 and from the motor through a lead 326 and the lead 300 to the other main line 242. Another lead 328 from the contacts 284 of timer 3T is connected to lead 324 and to one end of the coil of timer 2T, the other end of the coil being connected by a lead 330 to the main line 242. The coil of timer T is connected at one end thereof by a lead 325 and lead 316 to main line 242 and at the other end by a lead 328 and lead 324 to the normally open contacts 284 of relay 3T so that relay T is energized at the same time that relay 3T is energized. The complete circuit of the coil of relay T includes the lead 320 from the normally open contacts 284, lead 316, normally closed contacts 256 of relay T, leads 276, 274, 2CR2, leads 272 and 268 to the main line 244. The contacts 280 of timer 2T are connected by a lead 332 to lead 328 and thus by lead 324 to the contacts 284 of timer 3T. Also the contacts 280 of timer 2T are connected by leads 334, 336, 338 and 340 respectively to the coils of the solenoids 124, 84, 86 and 82 which have their other leads 342, 344, 346 and 348 each connected to the main line 242. Thus, when timer 3T contacts 284 close, the blow-down solenoid valve 124 is opened, the inlet solenoid valve 82 and the outlet solenoid valve 84 are closed and the sludge outlet solenoid valve 86 is opened. The valves remain in these positions until timer 2T acts to open its contacts 280 whereupon the valves are biased to their opposite or normal positions.

*General Operation*

Referring to the diagrammatic illustration of FIG. 15, the general description of operation of the filter apparatus will start with the assumption that the filtering operation is in progress which, of course, means that the line switch 246 is closed and as a consequence pumps 70 and 79 are operating. Except for the line switch, all of the controls including valves 82, 84, 86 and 124, the timers T, 2T, 3T, 4T and 5T and the various switches are in the positions they assume during the filtering operation. In such positions, the relays 2CR, 3CR, timers T, 2T, 3T, 4T and 5T and the solenoid valves 82, 84, 86 and 124 are all deenergized. When the solenoid valves are in their deenergized state, the valves 82 and 84 are open and valves 86 and 124 are closed. In the deenergized state of valves 82, 84, 86 and 124, the pump 70 is pumping contaminated liquid from the tank 20 through pipe 72 to filter 22 and from the filter, clean liquid is flowing to the storage container 26 whence pump 78, which operates continuously when line switch 246 is closed is pumping the liquid to its point of use. Also, when the filtering operation is in progress, the contacts 3CR3 of relay 3CR are closed and consequently suction pump 182 is operating. Operation of the suction pump 182 discharges some of the clean liquid from tank 26 through pipe 241, ejector 240 and pipe 187 into the contaminated liquid tank 20 whereby to effect an aspirating action at the ejector 240 to pump the contaminated liquid from the sludge disposal tank 150 through pipe 180, and ejector 240 into tank 20 without the contaminants passing through the pump.

When clogging of the filter elements of filter 22 by contaminants causes the filter pressure in the filter container 54 to rise to a predetermined pressure, the pressure switch 263 responds thereto and stops the filtering operation for a short interval and at the same time initiates the filter cleaning operation. When this occurs, relay 2CR is energized and its contacts 2CR2 close to establish a holding circuit for relay 2CR; contacts 2CR3 close to energize relay 3CR; and contacts 2CR4 open for the sole purpose at this time of preventing the energization of the timer 4T which is in series with 2CR4 and 3CR1. When relay 3CR is energized, the timer 5T is also energized and at the same time, the timer 3T is energized from the holding circuit which includes the relay contacts 2CR2. After an interval, timer 5T closes its contacts 288 and starts the conveyor motor 218 which operates until timer 3T, which has a longer interval of expiration than timer 5T, acts to open its contacts 282 which stops the conveyor motor. Thus, the conveyor 190 operates from the time that the contacts 298 of timer 5T close until the contacts 282 of timer 3T open. The contacts 3SR3 open instantly when 3CR is energized and stop the suction pump 182 which remains inactive during the operation of the conveyor motor 218. When the timer 3T opens its contacts 282, the timer also closes its contacts 284 whereupon the valves 82, 84, 86 and 124 immediately are reversed from their normal positions such that valves 82 and 84 are now closed and the compressed air valve 124 and the filter discharge valve 86 are now open. When this occurs, the compressed air drives the used filter aid from the filter elements 56 of filter 22 and discharges it together with the sludge and unfiltered liquid down through pipe 66 into the surge chamber 28 and thence downwardly onto the filter media 191 in the sludge disposal unit 24. Also, when the contacts 284 of timer 3T are closed the filter aid dispensing motor 132 is started and filter aid is dispensed by the screw feed 130 into chamber 144 of tank 20 until relay 2CR is deenergized upon the opening of contacts 256 of timer T. The opening of the contacts 280 of timer 2T stops the filter aid dispenser motor 132 and the contacts 256 of timer T are opened, the holding circuit of relay 2CR is broken which returns the switches and valves 82, 84, 86 and 124 back to their normal positions or positions they assume for the filtering operation. Return of the valves 82, 84 and 86 to normal allows the continuously operating pump 70 to start pumping the contaminated liquid and filter aid from tank 20 through pipe 72 into the filter container. When the pressure builds up in the filter container 54, the filter aid and contaminants form a filter cake on the filter elements 56. At the same time, the closing of relay contacts 3CR3 started the suction pump 182 which then withdrew the liquid from the sludge in tank 150 and pumped the liquid into tank 20. As the liquid is removed by the suction pump 182 from tank 150, the pump reduces the pressure in the tank 150 below atmospheric pressure if the top of the filter media is covered with sludge and slime. Pressure switch 352 responds to a predetermined reduction in pressure in the tank 150 completing a circuit from main line 244 through leads 268, 287, 291, 3CR2, 293, 292, closed contacts 282, lead 294, contacts 286, leads 296, 298, 306, the coils of timer 5T and relay 3CR and through lead 300 to the other main line 242. The contacts 3CR1 close and consequently the timer 4T is energized; contacts 3CR2 are closed to provide a holding circuit for the coils of timer 5T and relay 3CR; and the contacts 3CR3 are opened to stop the pump motor 184. At the end of a preset interval, the timer 5T contacts 288 close which energizes the conveyor motor 218. When the preset interval of timer 4T expires, the contacts 286 of the timer open to stop the conveyor motor 218 and also deenergize the relay 3CR and the timer 5T to return the pump 182 to its normal operating cycle.

*Detail description of operation*

In the diagrammatic illustration of FIG. 15, the various controls, such as the valves, timers, switches, etc., are in the positions they will assume when the system has been shut down by the opening of line switch 246. Also, the valves, timers and other switches are in the positions they will assume during the filtering operation when, of course, line switch 246 is closed and operation of the system is under control of the pressure switch 263. As a consequence, when the system is started in operation by the closing of line switch 246, the system starts on its cleaning cycle following the completion of which the various controls resume the positions shown to initiate the filter cycle. Since it has been herein described how the apparatus is started in operation by the closing of line switch 246, this description will not be repeated. but instead the present description will start with the assumption that the filtering operation is in progress. Thus, inlet valve 82 and outlet valve 84 are open and discharge valve 86 and compressed air valve 124 are closed. The circuit of these valves is as follows: From main line 244, lead 268, lead 272, relay contacts 2CR2, lead 274, lead 276, timer contacts 256, lead 264, lead 320, timer 3T, contacts 284, lead 324, lead 328, lead 332, time 2T contacts 280, lead 334, the coil of solenoid valve 124 and lead 342 to the other main line 242. The timer 2T controls the solenoid valves 124, 82, 84 and 86 and the circuit of the coil of timer 2T includes lead 332 which is connected to lead 328 and thus to main line 244 and by lead 330 to the other main line 242. The solenoid valves 84, 82 and 86 are connected in parallel with solenoid 124 by the leads 336, 344, 338, 340, 348 and 346. The timer 2T is the type which when energized maintains its normally closed position until expiration of its preset interval whereupon the switch contacts separate which terminates the cleaning cycle of operation of filter 22. The pump 78 started to operate when line switch 246 was closed since the pump motor 80 is connected directly across the main lines 242, 244.

The pump 70 is operating to deliver contaminated liquid from tank 20 through pipe 72 and the now open solenoid valve 82 to the container 54 of the filter 22, and the clean liquid flows from the top of container 54 through pipe 76 and the now open solenoid valve 84 into the clean liquid tank 26. The circuit of the motor 74 of pump 70 is as follows: From main line 244, lead 268 and pump motor 74 to the other main lead 242. Thus, pump 70 operates continuously when the line switch 246 is cslosed.

As previously mentioned, the suction pump 182 of the sludge disposal unit 24 is in operation during the filtering operation of filter 22 and has the dual function of (1) pumping the dirty liquid from tank 24 into tank 20 and (2) drying and removing the sludge on the filter medium 191 from tank 150. In operation, some of the clean liquid from tank 26 is drawn by the pump 182 through pipe 241 and discharged into tank 20 through ejector 240 connected to tank 24 by a pipe 187, to effect an aspirating action that pumps all the dirty liquid from tank 24 into tank 20 and thereafter draws air down through and dries the sludge on the filter media. The circuit of the motor 184 of the suction pump 182 is as follows: From the main line 244 through lead 268, lead 310, the relay contacts 3CR3, lead 312, pump motor 184 and lead 314 to the other main lead 242.

When the pump 184 reduces the pressure in chamber 150 of tank 24 to a predetermined pressure, the pressure switch contacts 352 close to stop the pump 182. This circuit is from the main line 244, lead 268, lead 287, lead 291, the now closed contacts 352 of pressure switch 352, lead 293, lead 292, the contacts 282 of timer 3T, lead 294, the contacts 286 of timer 4T, lead 296, lead 298, the coil of relay 3CR, and lead 300 to the other main lead 242. The closing of the above circuit energizes the relay 3CR which closes its contacts 3CR1 and 3CR2 and opens its contacts 3CR3. The opening of contacts 3CR3 breaks the circuit of the suction pump motor 184. Also, the timer 5T is energized when pressure switch 352 closes, the circuit including contacts 288 which close, after expiration of the preset interval of the timer, to complete a circuit from main line 244, lead 302 to the conveyor motor 218 and lead 304 to the other main lead 242. Thus, the conveyor motor 218 operates until timer 5T opens its contacts 286, the interval being calculated as sufficient to move clean filter media 191 over the outlet of chamber 150 of tank 24. The closing of the contacts of relay 3CR1 energized the coil of timer 4T. This circuit is from the main line 244 through lead 268, lead 287, the closed relay contacts 2CR4, lead 285, the now closed relay contacts 3CR1, lead 283, and lead 281 to the other main line 242. After a preset interval, the contacts of timer 4T open which deenergizes the relay 3SR and timer 5T the contacts of which return to the positions shown. The pressure switch 352 returns to open position when the vacuum in chamber 150 is broken by the aforementioned moving of clean filter media over the outlet of chamber 150.

When the filter elements 56 become clogged with foreign matter to the degree that filtering becomes inefficient, the resultant increase in pressure in filter container 54 closes the pressure responsive switch 263 which then stops the filtering cycle and at the same time initiates the filter cleaning cycle. The closing of the pressure switch 263 energizes the relay 2CR, the circuit including lead 260 from main line 244, pressure switch 263, lead 276, the contacts 256 of timer T, lead 264, relay 2CR and lead 266 to the other main lead 242. Upon energization of relay 2CR, its contacts 2CR4 open and its contacts 2CR2 and 2CR3 close. The closing of relay contacts 2CR2 closes a holding circuit for relay 2CR which circuit includes lead 268 from main line 244, lead 272, the now closed contacts 2CR2, lead 274, lead 276, contacts 256 of timer T, lead 316, lead 264, relay 2CR and lead 266 to main line 242. This holding circuit holds relay 2CR energized when the switch 263 opens as a result of pressure decreasing in the filter container 50 as evacuation of the container proceeds. At the same time that relay 2CR is energized, timer 3T is energized, the circuit being from lead 274 of the holding circuit of relay 2CR, through lead 314, timer 3T and lead 316 to main line 242. When the timing interval of 3T has expired, timer 2T is energized, the circuit of the timer 2T including lead 320 connected to lead 316 of the holding circuit of relay 2CR, the closed contacts 284, lead 324, lead 328, timer 2T and lead 330 to main line 242. With contact 284 closed, a circuit is completed through 2T and the solenoids 126, 82, 84 and 86 to energize the solenoids. When this occurs, the inlet valve 82 and the outlet valve 84 close and the discharge valve 86 and the air pressure valve open. The compressed air now evacuates the filter container of the filter aid, unfiltered liquid, dirt and other foreign matter which passes through the pipe 66 and is dumped into the sludge disposal unit 24 onto the filter media in the tank 150. The opening of relay 2CR contacts 2CR4 prevents the energization of timer 4T at this point of the operation. Also, when contacts 284 of timer 3T close, the filter aid dispenser motor 132 is energized and starts to operate the dispenser feed screw 130. This circuit includes a lead 320 from lead 264 of the holding circuit of relay 2CR, the now closed contacts 284 of timer 3T, lead 324, to the filter aid dispenser motor 132 and lead 300 to line 262. The dispenser motor 132 now operates until stopped by timer 3T which determines the dispensing of a desired amount of the filter aid into tank 20. It will thus be seen that simultaneously upon the closing of contacts 284, timers T, 2T, solenoids 82, 84, 86, 124 and the dispenser motor 132 are energized.

When relay 2CR is energized, the relay 3CR is energized, the circuit including the lead 268 from main line 244, lead 289, the now closed relay contacts 2CR3, lead 290, lead 292, the contacts 282 of timer 3T, lead 294, the contacts 286 of timer 4T, lead 296, the coil of timer 5T and the coil of relay 3CR and lead 300 to the other line 282. Timer 5T is energized to close its contacts 288 after elapse of the preset interval of the timer and when the contacts 288 are closed the circuit of the conveyor motor 218 is completed whereupon the conveyor is driven by the motor. When relay 3CR is energized, contacts 3CR3 open to stop the pump 182 during operation of the conveyor drive motor 218. Contacts 3CR1 and 3CR2 also close but have no function at this time. When the preset interval of timer 2T expires, the timer contacts 280 open which breaks the circuit of the solenoid valves 82, 84, 86 and 124 which valves then resume their normal positions, or positions they assume for the filtering cycle of operation of filter 22. When the interval expires for which the timer T is set, the contacts 256 of the timer open to deenergize the relay 2CR to effect resumption of the filtering cycle of operation.

While I have shown an described my invention in considerable detail it will be understood that many variations thereof may be employed without departing from the spirit and scope of the invention.

I claim:

1. In a method of filtering contaminated liquid by flowing the liquid through a filter container for removal of contaminants at filter elements disposed in said container and pre-coated with a filter medium, said container communicating with a separate sludge tank, the steps of pneumatically blowing down the container contents including contaminated medium into said separate sludge tank, thereby progressively emptying said container; during the progressive emptying of said container, forming a slurry of fresh pre-coat medium and liquid; and, at the conclusion of said blowing down step, refilling said container with liquid including said slurry, again flowing contaminated liquid through said container to deposit said fresh pre-coat medium on said filter elements, and initiating the filtration of said sludge at a second non-pre-coated medium communicating with said sludge tank.

2. In a method of operating an automated pre-coat filter having a filter container normally full of liquid and into which contaminated liquid is introduced for flow therethrough, any solid contaminants being removed from the liquid during liquid flow through a plurality of filter elements disposed in said container and pre-coated with a filter medium, said container being connectable to a sludge tank, the steps of interrupting the flow of contaminated liquid through said container, interconnecting said container and said sludge tank, injecting air under pressure into the filter container which contains a sludge comprising used pre-coating medium admixed with contaminating liquid, utilizing the air under pressure to empty the container by flowing the sludge therefrom into the sludge tank, storing the sludge in said sludge tank, admixing fresh pre-coat medium with liquid as the container is being emptied, when the sludge is removed from the container, introducing the admixed fresh pre-coat medium and liquid into the filter container to fill the container, and reestablishing the flow of contaminated liquid through said container and filtering sludge from said sludge tank through a second filter medium different from the pre-coat medium.

3. In a method of filtering a contaminated liquid wherein the contaminated liquid is introduced through an inlet opening into a pressure filter container for flow therethrough, said container normally being full of liquid with filtrate liquid flowing from the container through an outlet opening, said container having perforate filter elements pre-coated with filter aid material and interposed between said inlet and said outlet openings, and a separate sludge tank into which the container contents can be emptied, the steps of (1) in response to clogging of the filter medium, closing the inlet and outlet openings and establishing communication between said container and said sludge tank; (2) introducing air under pressure into the said container to force the container contents, including used filter aid, into said separate sludge tank, thereby emptying the container; (3) during the emptying of the container, admixing fresh particulate filter aid material with liquid; substantially simultaneously (4) terminating the introduction of air into the container, (5) reopening the container inlet and outlet openings, and (6) introducing the liquid admixed with said fresh particulate filter aid material into said container to refill the container with liquid and to pre-coat said filter elements; and (7) subsequently resuming normal filtering operation.

References Cited by the Examiner

UNITED STATES PATENTS

| | | | |
|---|---|---|---|
| 2,366,903 | 1/45 | Harms et al. | 210—108 |
| 2,423,172 | 7/47 | Booth | 210—75 X |
| 2,828,862 | 4/58 | Johnson | 210—82 |
| 2,867,324 | 1/59 | Hirs | 210—97 |
| 2,867,325 | 1/59 | Hirs | 210—138 |
| 2,867,327 | 1/59 | Hirs | 210—138 |
| 2,909,285 | 10/59 | Besler | 210—533 X |
| 2,952,363 | 9/60 | Griswold | 210—193 |
| 3,037,635 | 6/62 | Boorujy | 210—193 X |

REUBEN FRIEDMAN, *Primary Examiner.*

HARRY B. THORNTON, HERBERT L. MARTIN, EUGENE F. BLANCHARD, *Examiners.*